United States Patent [19]

Orem

[11] E Patent Number: Re. 33,122

[45] Reissued Date of Patent: Dec. 5, 1989

[54] APPARATUS FOR LOADING BAGS

[75] Inventor: William G. Orem, Clifton, N.J.

[73] Assignee: Mobil Oil Corporation, New York, N.Y.

[21] Appl. No.: 836,225

[22] Filed: Feb. 28, 1986

Related U.S. Patent Documents

Reissue of: 4062170

[64] Patent No.: [redacted]
Issued: Dec. 13, 1977
Appl. No.: 778,406
Filed: Mar. 17, 1977

U.S. Applications:

[63] Continuation of Ser. No. 734,247, May 14, 1985, abandoned, which is a continuation of Ser. No. 452,472, Dec. 23, 1982, abandoned, which is a continuation of Ser. No. 102,815, Dec. 12, 1979, abandoned.

[51] Int. Cl.[4] ..... B65B 67/12; B65B 1/04

[52] U.S. Cl. ..... 53/459; 53/473; 53/390; 53/572; 186/66; 248/100

[58] Field of Search ..... 53/384, 571, 390, 572, 53/459, 469, 473, 570; 141/10, 391, 390; 186/66; 248/95, 100, 99, 101

[56] References Cited

U.S. PATENT DOCUMENTS

| | | | |
|---|---|---|---|
| 142,286 | 8/1845 | Mayer . | |
| 461,291 | 10/1891 | Timmerman . | |
| 477,235 | 6/1892 | Timmerman . | |
| 810,329 | 1/1906 | Dyett . | |
| 989,642 | 4/1911 | Raw . | |
| 992,445 | 5/1911 | Parson . | |
| 1,005,956 | 10/1911 | Gibbons | 248/100 X |
| 1,005,965 | 10/1911 | Gibbins . | |
| 1,351,094 | 8/1920 | Buckel . | |
| 1,431,726 | 10/1922 | Cupples | 248/99 X |
| 1,445,269 | 2/1923 | Cupples | 248/99 |
| 1,455,536 | 5/1923 | Lebherz | 248/100 X |
| 1,653,393 | 12/1927 | Cox . | |
| 1,700,248 | 1/1929 | Wolfe | 248/100 |
| 2,141,752 | 12/1938 | Hoarle . | |
| 2,188,047 | 1/1940 | Jones | 248/99 |
| 2,261,511 | 11/1941 | Baker et al. . | |
| 2,557,674 | 6/1951 | McRae . | |
| 2,941,673 | 6/1960 | Lomas . | |
| 3,176,950 | 4/1965 | Hittesdorf . | |
| 3,180,557 | 4/1965 | Thulin . | |
| 3,260,488 | 7/1966 | Kliewer et al. . | |
| 3,298,416 | 1/1967 | Grady . | |
| 3,312,339 | 4/1967 | Million . | |
| 3,352,411 | 11/1967 | Schwarzkopf . | |
| 3,358,904 | 12/1967 | Van Houtte . | |
| 3,468,100 | 9/1969 | Rubel | 53/385 X |
| 3,512,338 | 5/1970 | Nestler | 53/390 |
| 3,605,383 | 9/1971 | Piazze | 53/385 |
| 3,646,723 | 3/1972 | Meroney | 141/390 X |
| 3,678,652 | 7/1972 | Panasewicz | 53/385 |
| 3,707,826 | 1/1973 | Cole | 53/384 |
| 3,715,854 | 2/1973 | Smith et al. | 53/572 |
| 3,727,374 | 4/1973 | Williams | 53/385 X |
| 3,747,298 | 7/1973 | Liberman | 53/390 |
| 3,774,838 | 11/1973 | Christie . | |
| 3,838,839 | 10/1974 | Spencer . | |
| 3,840,092 | 10/1974 | Close | 53/384 X |
| 3,869,065 | 3/1975 | Wang | 53/384 X |
| 3,905,406 | 9/1975 | Cruse . | |
| 3,973,376 | 8/1976 | Suominen . | |
| 4,085,822 | 4/1978 | Osborn | 186/66 |

FOREIGN PATENT DOCUMENTS

| | | | |
|---|---|---|---|
| 221765 | 10/1909 | Fed. Rep. of Germany . | |
| 1844267 | 12/1961 | Fed. Rep. of Germany . | |
| 2002732 | 8/1970 | Fed. Rep. of Germany | 248/100 |
| 1950868 | 5/1971 | Fed. Rep. of Germany . | |
| 1950968 | 5/1971 | Fed. Rep. of Germany . | |
| 1335371 | 2/1964 | France . | |
| 1355371 | 2/1964 | France . | |
| 61848 | 5/1968 | German Democratic Rep. . | |
| 120020 | 10/1970 | Norway | 248/100 |
| 89051 | 4/1937 | Sweden . | |
| 405057 | 7/1966 | Switzerland . | |
| 1016676 | 1/1966 | United Kingdom . | |

OTHER PUBLICATIONS

Article entitled: "Marketote . . . the new plastic grocery sack . . . ", Mobil Plastics Packaging, Macedon, N.Y. 14502.

Advertisement for Roll and Rack automatic waste receptacle, Extrufix Co., Ltd., Weston, Canada.

*Primary Examiner*—Robert L. Spruill
*Assistant Examiner*—Beth Tenney

*Attorney, Agent, or Firm*—Alexander J. McKillop; Charles J. Speciale; James P. O'Sullivan, Sr.

[57] ABSTRACT

An apparatus for dispensing individual plastic handle bearing bags from a stack of bags and holding the dispensed bag in an open position for loading. The apparatus comprises a bottom support member and two spaced-apart, oppositely disposed upwardly projecting tab members such that the apparatus has an opening corresponding approximately to the size of the open bag it is designed to contain. The upwardly projecting elongated tabs are compatible in size with the open portion of the bag handles and each is adapted to engage a handle of the bag in such manner that the bag is held suspended within the apparatus.

49 Claims, 4 Drawing Sheets

Fig. 1
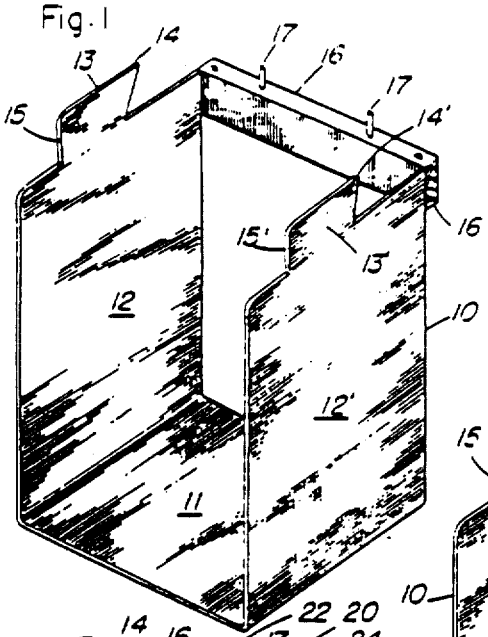
Fig. 6
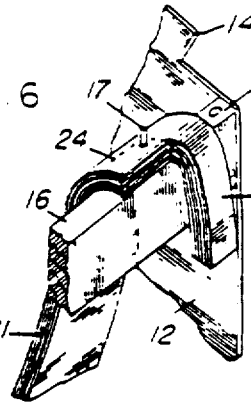
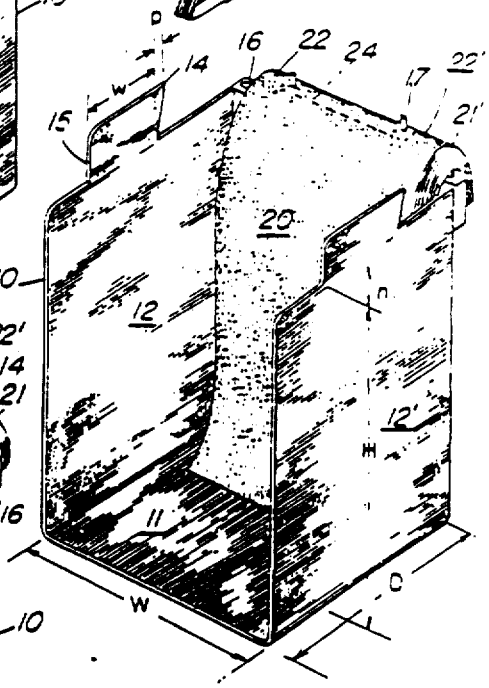
Fig. 2
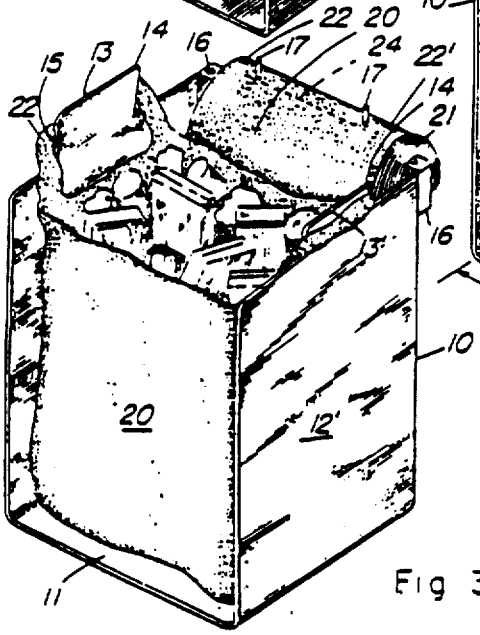
Fig 3

APPARATUS FOR LOADING BAGS

Matter enclosed in heavy brackets [ ] appears in the original patent but forms no part of this reissue specification; matter printed in italics indicates the additions made by reissue.

*CROSS REFERENCE-TO RELATED APPLICATIONS*

*This application is a continuation of Ser. No. 735,247 filed on May 14, 1985, now abandoned, which is a continuation of Ser. No. 452,472 filed on Dec. 23, 1982, now abandoned, which is a continuation of Ser. No. 102,815 filed on Dec. 12, 1979, now abandoned, which is a reissue of 778,406 filed Mar. 17, 1977 now U.S. Pat. No. 4,062,170, issued Dec. 13, 1977.*

BACKGROUND OF THE INVENTION

1. Field of the Invention

This invention relates in particular to merchandise packaging systems and more particularly to a system for packaging individual items, such as groceries, in a handle-bearing plastic bag.

2. Description of the Prior Art

A traditional and long-accepted method for packaging merchandise, such as groceries at the check-out counters of grocery stores, has involved the loading of individual paper bags, a process which is oftentimes inefficient, time-consuming, and expensive. The person doing the bagging retrieves a bag from a stack, often under a counter, normally opens it by a quick motion of the arm causing air to catch in the bag and distend it, and then sets the bag upright on the counter. In the case of double bagging operations, a second bag must be opened in the same manner and then inserted inside the first bag to provide extra strength. The merchandise, e.g. groceries, is then placed into the open bag and the filled bags are slid across the counter so that the customers can put their arms around the middle of the bags and carry them out. Often, moisture absorption from the products contained within the heavily ladened bags will weaken the bottoms thereof, tending to cause them to separate or tear.

Although the general concept of packaging items in plastic bags is well known, prior art attempts to use such a concept to package merchandise in an environment such as, for example, that encountered at a modern grocery store check-out counter have, for the most part, met with little success. Thin plastic bags are very limp in nature and this characteristic not only adversely effects the loading operation, but any attempt to carry such a bag, loaded with groceries, at the mid-portion thereof proves to be very awkward because of the limp film's tendency to allow the upper portion of the bag to fold over, usually with disastrous consequences.

Recent attempts to remedy these deficiences of plastic bags have included the provision on the bag of handles adjacent to the mouth of the bag. This has helped to alleviate the carrying problem, but the loading operation has remained a problem because of the difficulties attendant in loading a limp plastic bag which is not self-supporting. Elaborate devices have been used to open and support the empty bags, such as blowers which fill the bag with air and vacuum systems which hold the walls of the bag apart and upright, but these can be expensive, require substantial redesign and modification of check-out counters and are subject to mechanical break-down in heavy use. Although semi-rigid plastic films, such as vinyl, high density polyethylene and high modulus laminar structures formed therefrom, are available and could be used to construct bags which are self-supporting, the cost of such material is far beyond the relative costs of paper packaging materials and therefore, although a potential solution, it is one which is economically unattractive.

SUMMARY OF THE INVENTION

The present invention relates to an arrangement adapted to facilitate the use and loading of a plastic bag, such as at the check-out counter of a retail grocery store or other business establishment, from a stack of plastic bags, each of which bags has integrally formed handle loops oppositely disposed about the mouth thereof. Such a stack of bags is preferably suspended from the rear portion of an apparatus as described herein with the bag mouth uppermost. Generally, the apparatus comprises a substantially horizontal support surface adapted to support the bottom of the bag during loading, a first upwardly projecting elongated tab supported at an elevation above the horizontal support surface approximately equal to the vertical distance between the open area of a handle of the bag and the bottom of the bag when the bag is in open condition and resting on the horizontal support surface, and a second upwardly projecting elongated tab which is spaced apart from the first tab and supported at substantially the same height above the horizontal support surface. The second tab is disposed substantially parallel to the first tab and spaced apart therefrom at a distance which is substantially the same as the distance between the handles of the open bag. Both of the tabs are of substantially similar configuration and each is adapted to fit within the open area of one of the bag handles. Each tab has a rearwardly directed protrusion at one end portion of the tab which is adapted to retain a handle of the bag on the tab when the bag is suspended in the apparatus.

The apparatus, in a preferred embodiment, has a substantially U-shaped opening and comprises a bottom support member and two oppositely disposed side walls upstanding from said bottom member. The size of the U-shaped opening corresponds approximately to the size of the open bag it is designed to contain. The upper end of each side wall contains an upwardly projecting elongated tab, compatible in size with the open portion of the bag handles and adapted to engage a handle of the bag in such a manner that the bag is held suspended within the U-shaped opening and in open position.

In use, a clerk or other person who is bagging the merchandise (e.g. groceries) grasps the topmost bag (from a stack of bags) by its handles, one in each hand, and opens the handle area. In the same motion the handle openings are placed over the end portion of the tab, as described more fully hereinafter, and, once secured in this fashion, the handles are pulled taut and slipped over the opposite edge of the tabs such that the mouth of the bag is held fully open and the bottom support surface of the apparatus supports the bag.

When the bag is fully loaded, the handles are removed from the tabs in the reverse order of placement thereon. With the handles free from the holder, the bagger lifts or slides the bag out of the apparatus and gives it to the customer to carry out or place in one of the many types of carts or tote boxes to be transported to the customer's waiting vehicle.

BRIEF DESCRIPTION OF THE DRAWINGS

FIG. 1 is a perspective view of an apparatus in accordance with the present invention.

FIG. 2 is the apparatus of FIG. 1 showing a stack of plastic bags thereon.

FIG. 3 is the apparatus of FIG. 1 showing a loaded bag suspended by its handles in the manner of the present invention.

FIG. 6 is a fragmentary cross-sectional view taken on line 6—6 of FIG. 5.

DESCRIPTION OF SPECIFIC EMBODIMENTS

Figure 4:
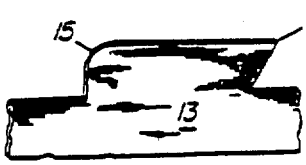
FIG. 4 is a detail view of the projecting tab of FIG. 1.
Figure 7:
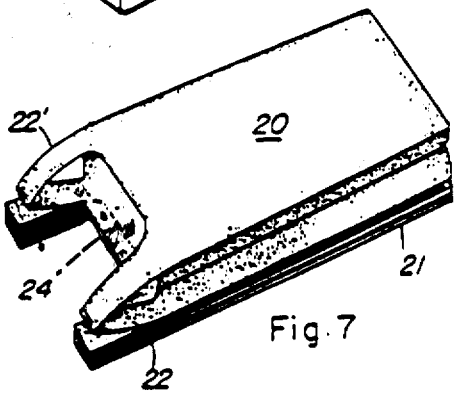
FIG. 7 is a perspective view of a bag pack which may be employed in the practice of the present invention.

The apparatus of the present invention is depicted in FIG. 1 of the drawings in a preferred embodiment. Basically, it comprises a support enclosure 10 having a bottom wall 11 and oppositely disposed upstanding side walls 12 and 12'. At the top of side walls 12 and 12' are upwardly projecting elongated tabs 13 and 13', respectively, of reduced width as compared to the width of walls 12 and 12'. These may be seen in greater detail in FIG. 4. Each of tabs 13 and 13' has a horizontally extending protrusion 14 and 14', respectively, extending from one end portion thereof, which functions to secure a handle of the plastic bag as will be described hereinafter, and oppositely disposed edge 15 and 15', respectively. As shown in the drawings, the tabs 13 and 13' are disposed in a manner such that the directional placement thereon of protrusions 14 and 14', respectively, are in correspondence. In one preferred embodiment a bag pack support 16 may be attached to the upper rear portion of enclosure 10, spanning the U-shaped opening of said enclosure and connected to side walls 12 and 12' thereof. Support 16 has projecting therefrom pegs 17 which are spatially arranged so as to mate with the holes in perforated tab section 24 of bag pack 21 (see FIG. 7).

Figure 8:
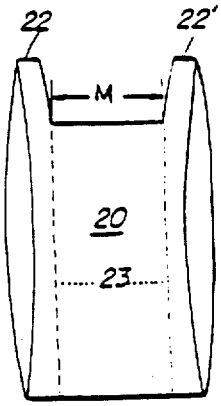
FIG. 8 is an individual bag which may be employed in the present system.

Individual bag structures suitable for use in the practice of this invention include those described in U.S. Pat. No. 3,180,557, and in German Gebrauchsmuster No. 1,844,267 (Bischof and Klein), the disclosures of which are incorporated herein by reference, As shown in FIG. 8, such individual bag structure 20 is desirably side gusseted, as at 23, to increase holding capacity while minimizing the storage and shipping space for such bags. Bag 20 may be formed from a gusseted flattened tube of thermoplastic material such as polyethylene. The gusseted flattened tube is heat sealed and severed along lengths of the tube which correspond to the height of the bag. One heat sealed and severed end is cut out in a generally U-shaped configuration intermediate the gusseted areas 23 therein, forming an open bag mouth with loop handles 22 and 22' on opposite sides thereof. It will be noticed that when such bags are loaded with, for example, grocery items, the bag handles 22 and 22' may be grasped to provide a convenient carrying arrangement whereby the grocery sacks can be carried in the fashion of a shopping bag rather than as the conventional handleless paper bag which of necessity is grasped around its central portion. With a bag structure such as bag 20, multiple bags can be carried in each hand by the consumer. Further, since such bags are formed from plastic, they are moisture proof and accordingly reduce substantially the incidence of bag breakage or leakage.

The bag structures 20, when employed in the present invention, are preferably assembled in packs of, for example, 50–100 bags. Such a bag pack is shown as 21 in FIG. 7. The bags are assembled utilizing conventional techniques, such as staples or heat welding through an area adjacent to the bag mouth and within the confines of a perforated tab section 24 on the upper portion of the front and rear walls of the bag. The perforated tab area 24 will preferably have holes punched therein, thereby enabling the bag pack to be suspended from bag support 16 at the rear of enclosure 10 by placing the aforementioned pegs 17 into and through these holes, as can be seen in FIGS. 2 and 6.

A method of employing the apparatus of this invention is as follows, referring to FIGS. 1, 2 and 3 of the drawings. The bagger grasps the topmost bag from pack 21, which has been suspended from support 16 of enclosure 10, by its handles 22 and 22' holding one handle in each hand and opening the handle area. In the same motion the handle openings are placed over the horizontally extending protrusions 14 and 14' and, once secured in this fashion, the handles 22 and 22' are pulled taut and slipped over the opposite edges 15 and 15' of the tabs. This holds the mouth of the bag fully open while the bottom wall 11 and side walls 12 and 12' of enclosure 10 assist in supporting and shaping the open bag.

Figure 5:
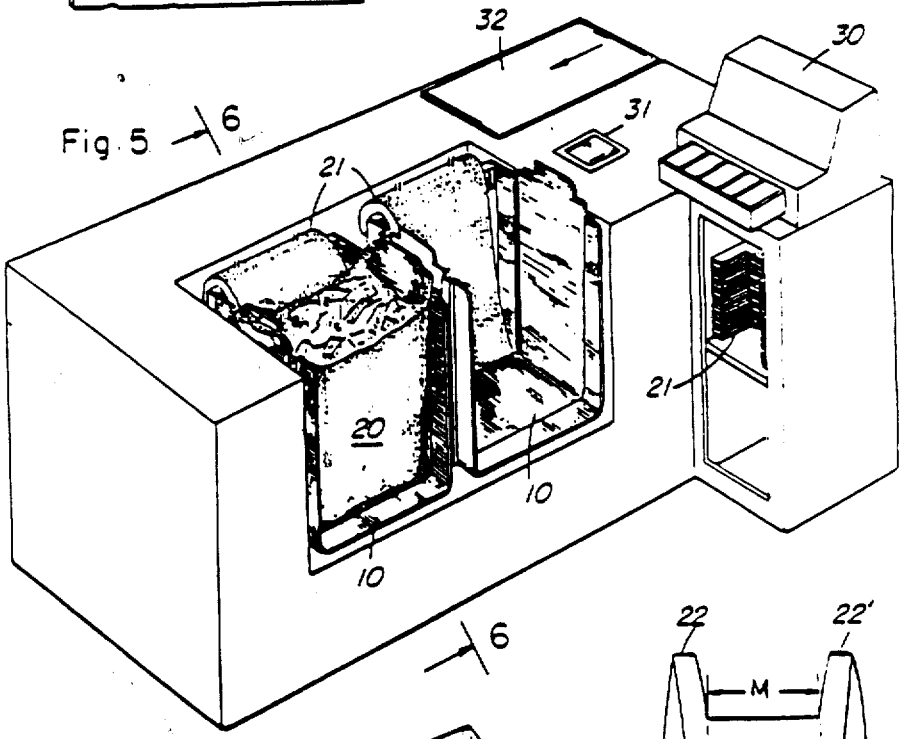
FIG. 5 is a schematic perspective view of a retail grocery market check-out arrangement in accordance with the present invention.

FIG. 5 shows one method of utilizing the device of this invention in connection with a retail grocery store check-out counter which may typically include a cash register 30 or some other type of registering device, which may be a component part of a computerized system for product identification and pricing computation, such as Universal Product Code detection means 31. The grocery items are normally deposited on counter top 32 for itemization by a checker. As the price of each is recorded by the appropriate means, the items are placed into bag 20 or, alternatively, the items may be placed in bag 20 after they have all been recorded, depending upon the type of checking system peculiar to the individual store.

After the bag has been completely loaded, the handles are removed from tabs 13 and 13' in the reverse order of initial placement thereon, i.e. the forward portions of the handles are lifted up and off the tabs and the rearward portions of said handles are then free to slip off the protrusions 14 and 14'. With the handles free from the holder, the bagger removes the bag by the handles 22 and 22' and either gives it to the customer to carry out or places the loaded bag in one of the many types of carts or tote boxes intended for transporting such items to the customer's waiting vehicle.

Figure 9:
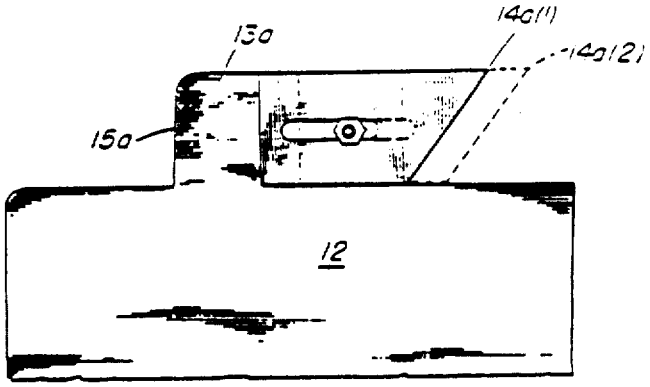
FIGS. 9, 10 and 11 are detail views of alternate embodiments of the projecting tab.
Figure 10:
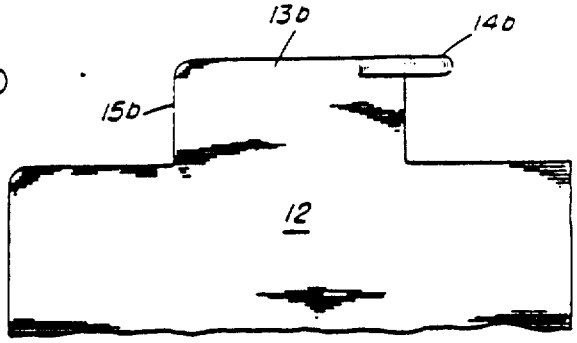
Figure 11:
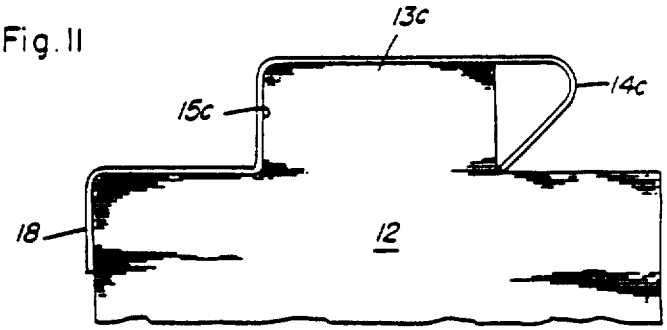

FIGS. 9, 10 and 11 illustrate examples of alternate embodiments of the upwardly projecting tabs 13 and 13'. In FIG. 9, the tab 13a is shown as being of substantially symmetrical configuration and having an adjustable member 14a attached thereto. In an embodiment such as this the member 14a can be adjusted, as shown in the drawing by 14a(1) and 14a(2), to accommodate different size openings in the handle area of bag 20, thereby allowing the device to be utilized in conjunction with different sized bags. Member 14a can be moveably mounted on tab 13a by any conventional means, such as the slot and bolt arrangement shown in FIG. 9. Other suitable means will be apparent to those skilled in the art. FIG. 10 illustrates an embodiment in which the protrusion 14b is a separate piece which has been attached to projecting tab 13b. Such attachment may be by means of welding, bolting, riveting, use of an adhesive, or by any other conventional means which would hold protrusion 14b in a suitably stationary fashion on tab 13b. FIG. 11 shows still another embodiment wherein the protrusion 14c is formed from a separate strip of material 18, which is attached to the top edge of tab 13c and continues to run along oppositely disposed edge 15c and also along the edge of side wall 12. The protrusion is formed by extending strip 18 past tab 13c and then bending it downwardly, such that the resulting curve protrudes the requisite distance, and attaching the end thereof to the base of tab 13c by suitable means, e.g. welding. The entire length of strip 18, where it contacts the exposed edges of side wall 12 and tab 13c, is attached by suitable means (e.g., welding). In a preferred embodiment, the strip 18 is a length of round metallic material, such as wire or a metal rod, which when attached to the apparatus in the above manner forms a smooth, rounded edge thereon.

Figure 12:
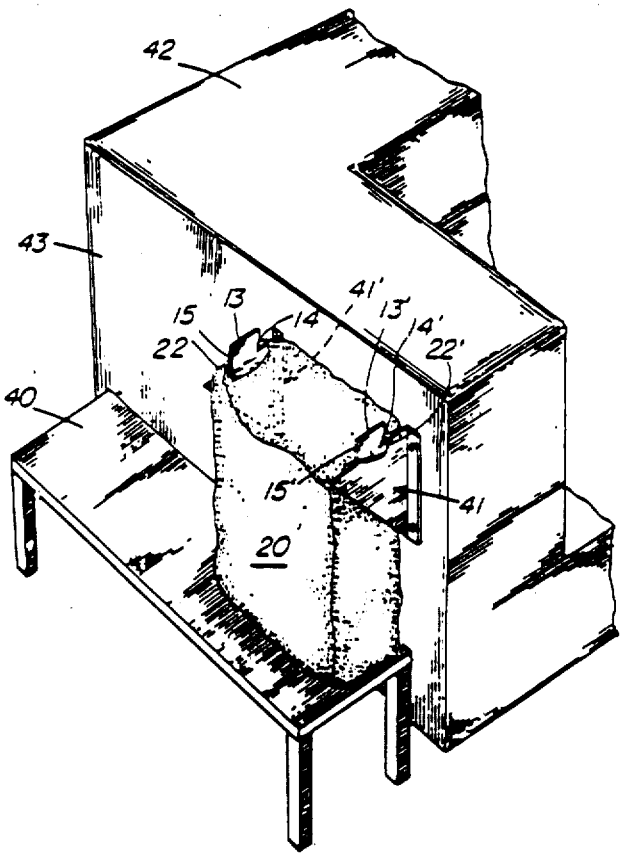
FIG. 12 is another embodiment of the present invention installed on a check-out counter of a business establishment.

Another embodiment of this invention, as illustrated by FIG. 12, involves the utilization of spaced-apart, substantially parallel upwardly projecting elongated tabs 13 and 13' in association with a horizontal bottom support surface 40 suitably positioned below said tabs 13 and 13'. In such an embodiment, the tabs 13 and 13' are attached to an object, such as a vertical wall 43 of a check-out counter 42, by means of suitable extensions 41 and 41' and positioned relative to one another such that bag 20, when suspended therefrom by means of handles 22 and 22' in the aforedescribed manner, would be held in fully open position as in the previous embodiments. A horizontal support surface, which may be a table 40, a portion of the counter structure itself, or any other suitable means, is positioned below said tabs 13 and 13' such that the bottom surface of the fully opened bag structure 20 rests on said support surface when said bag is suspended from said tabs and provides support for the bag during the loading operation.

The apparatus of this invention, particularly in regard to the elongated tabs may conveniently be constructed of metal, plastic, wood, or any other suitable substantially rigid material, or any combination thereof. Such material of construction may be in sheet form, heavy gauge wire, strips, etc., which form a frame conforming to the apparatus disclosed herein. The dimensions of the opening of the enclosure should preferably be substantially the same as those of the open plastic bag being utilized therein and projecting tabs 13 and 13' should be compatible in size with the open portion of the bag handles 22 and 22'. Such device may be used as an individual apparatus on the top of a counter, installed in recesses specially adapted for the purpose as in FIG. 5, or constructed as an integral component part of a specially designed check-out counter.

EXAMPLE I

An apparatus (as shown in FIGS. 1, 2 and 3) for holding plastic grocery sacks was constructed from metal sheet stock material. The overall dimensions of the apparatus, exclusive of the projecting tabs 13 and 13', were: height (H) 38.1 cm; width (W) 31.3 cm; and depth (D) 22.9 cm (see FIG. 3). The projecting tabs 13 and 13' measured: height (h) 3.2 cm by width (w) 16.8 cm at the base, in addition to a protrusion (p) of 1.0 cm extending from the top of the tab. The protrusion was constructed separately from urethane sheet stock and had an overall length of 7.6 cm, with 6.7 cm of that length overlapping the tab and being fastened to it by means of rivets (see FIG. 10). The bag pack support was constructed from sheet metal and nylon stock and was attached near the top of both of the oppositely disposed upstanding sidewalls 12 and 12' by means of welds. The bag pack support 16 has two vertically standing pegs 17, 6.4 cm apart and each 12.4 cm from the nearest end of said support, said pegs being 0.5 cm in diameter and 3.2 cm high.

The plastic bag used for this purpose was a loop handle polyethylene bag structure (see FIG. 8). Its dimensions, when opened, were 30.5 cm wide by 20.3 cm deep (as measured at the opening) by 38.1 cm of usable height. When closed, the bag mouth (M) (see FIG. 8) was 17.8 cm long, as measured from the inside edge of handle 22 to the inside edge of handle 22', and said handles were 6.4 cm wide and extended 15.2 cm beyond the main body of said closed bag. The polyethylene film from which these bags were constructed had a nominal thickness of 0.05 mm (2 mils). The bags were used in stacks of 50 and fastened together by means of staples at area 24 adjacent to the mouth of the bags. This area was perforated (see FIG. 7) to facilitate easy removal of individual bags from the stack and also contained two pre-drilled holes, which corresponded in size and spacing to the pegs in the bag pack support, such that the entire stack of bags was suspended from the bag support by placing each hole over one of the pegs and draping the handles of the stacked bags over the support (as in FIG. 2).

EXAMPLE II

The structure of the apparatus was substantially the same as that of Example I with the exception of the protrusions. In this example, and with reference to FIG. 11 of the drawings, the projecting tabs 13c were rectangular and the protrusions 14c were formed using 10 gauge wire 18 which was attached at the point of intersection of each projecting tab 13c with its respective side wall 12, bent to form a suitable protrusion 14c, and then welded along the top edge of tab 13c, down oppositely disposed edge 15c, along the upper edge of side wall 12 and continuing partially down the side edge thereof. The apparatus of this example provided an uppermost edge which was smooth and rounded and thereby convenient to work with.

Although the present invention has been described with reference to preferred embodiments, it is to be understood that modifications and variations may be resorted to without departing from the spirit and scope of the invention, as those skilled in the art will readily appreciate. For example, the specific configuration of the protrusions extending from tabs 13 and 13' would be a design consideration, as would be the configuration of the tabs themselves and their position at the top of walls 12 and 12' relative to the vertical edges thereof, such design considerations having no limiting effect on the inventive concept as disclosed herein. Also, although in the Examples bags made of polyethylene having a nominal thickness of 0.05 mm (2 mils) were utilized, it is contemplated that bags made of other plastic materials and bags having other thickness (e.g. about 0.025–0.075 mm of 1–3 mils) would function just as well for the purposes of this invention.

I claim:

1. An apparatus that facilitates the loading of articles in an open mouth plastic bag having integral handle loops disposed on opposite sides of the mouth thereof, whereby said bag is suspended within said apparatus and held in open position by means of said handles, said apparatus comprising:

a. a substantially horizontal support surface to support the bottom of said bag during loading;

b. a first upwardly projecting elongated *fixed* tab, supported at an elevation above said horizontal support surface approximately equal to the vertical distance between the open area of a handle of such a bag and the bottom of said bag when said bag is in open condition and resting on said horizontal support surface;

c. a second upwardly projecting elongated *fixed* tab, *fixedly and immovably* spaced apart from said first tab and supported at substantially the same height above said horizontal support as said first tab, said second tab being disposed substantially parallel to said first tab and spaced apart therefrom at a distance substantially the same as the distance between said handles when said bag is in open condition;

d. both of said tabs being of substantially similar configuration and each of which tabs is adapted to fit within the open area of one of said handles; and e. a rearwardly directed protrusion at one end portion of each of said tabs, each of which protrusions is adapted to retain on its tab a handle of said bag when said bag is suspended in said apparatus.

2. The apparatus of claim 1 wherein said first and said second tabs are supported by a single support means to which both of said tabs are attached.

3. The apparatus of claim 1 wherein said first tab and said second tab are separately supported *by respective separate support means* at said elevation above the bottom supporting surface.

4. The apparatus of claim 3 wherein said separate support means are upstanding from and connected to said bottom support surface and are oppositely disposed thereon.

5. The apparatus of claim 4 wherein each of said separate support means comprises a side wall upstanding from said horizontal bottom support surface, and wherein said first and second upwardly projecting elongated tabs each project from the top edge of one of said walls and is of reduced width relative to the width of said walls.

6. The apparatus of claim 5 further comprising a horizontally disposed member, adapted to hold a stack of said plastic bags, each end of said member being attached to the upper portion of one of said side walls such that said member spans the open area between said side walls but does not interfere with a bag suspended within said apparatus.

7. The apparatus of claim 6 constructed as a free-standing unit.

8. The apparatus of claim 6 installed in a check-out counter of a business establishment.

9. The apparatus of claim 8 constructed as a built-in, integral component of the check-out counter.

10. The apparatus of claim 1 wherein said rearwardly directed protrusions are constructed from a separate strip of material, which material is bent into a curved configuration to form said protrusions and the remaining length of which material is made to conform to the contour of the upper edge of said tab.

11. The apparatus of claim 1 wherein said rearwardly directed protrusions are an integral part of said tabs.

12. The apparatus of claim 1 wherein said rearwardly directed protrusions are constructed separately from said tabs and are adjustably mounted thereon.

13. The apparatus of claim 1 wherein said rearwardly directed protrusions are constructed separately from said tabs and are rigidly mounted thereon.

14. The apparatus of claim 1 further comprising a plastic bag, having integral handle loops on opposite sides of the opening thereof, suspended therein by means of said handle loops being stretched over said upwardly projecting tabs and with the bottom surface of said bag resting on said horizontal support surface.

*15. The apparatus of claim 1 further comprising at least one of said open mouth plastic bags.*

*16. The apparatus of claim 1 further comprising a horizontally disposed member for holding a stack of said plastic bags, said holding member being located rearwardly of said first and second tabs, and a stack of said plastic bags located on said holding member.*

*17. The apparatus as in claim 1, wherein each of said tabs is respectively supported by support means which is integral with said tabs, said tabs having a reduced width with respect to the width of a respective integral support means.*

*18. The apparatus as in claim 1, wherein each of said tabs is supported by a single support means which is integral with said tabs, said tabs having a reduced width with respect to the width of a respective integral support means.*

*19. The apparatus of claim 1, further comprising means for supporting said tabs in said spaced apart relationship, said supporting means supporting said tabs in respective planes which are parallel to one another and in a manner which defines an unimpeded opening between said planes at a front side of said tabs, permitting the passage of a said bag through said opening and between said tabs.*

*20. An appartaus as in claim 1, wherein said tabs are located in respective, different planes which extend upwardly.*

*21. The apparatus of claim 3, wherein said separate support means extend upwardly relative to said bottom support surface.*

*22. An apparatus that facilitates the loading of articles in an open mouth plastic bag having integral handle loops disposed on opposite sides of the mouth thereof, whereby said bag is suspended within said apparatus and held in open position by means of said handles, said apparatus comprising:*

*a. a substantially horizontal support surface to support the bottom of said bag during loading;*

*b. a first upwardly projecting elongated fixed tab, supported at an elevation above said horizontal support surface approximately equal to the vertical distance between the open area of a handle of such a bag and the bottom of said bag when said bag is in open condition and resting on said horizontal support surface;* c. a second upwardly projecting elongated fixed tab, fixedly and immovably spaced apart from said first tab and supported at substantially the same height above said horizontal support as said first tab;

d. both of said tabs being of substantially similar configuration and each of which tabs is adapted to fit within the open area of one of said handles;

e. a rearwardly directed protrusion at one end portion of each of said tabs, each of which protrusions is adapted to retain on its tab a handle of said bag when said bag is suspended in said apparatus; and f. a rearwardly located means for holding a stack of said plastic bags.

23. An apparatus that facilitates the loading of articles in an open mouth plastic bag having integral handle loops disposed on opposite sides of the mouth thereof, whereby said bag is suspended within said apparatus and held in open position by means of said handles, said apparatus comprising:

a. a first elongated fixed tab means upwardly projecting from a first support means;

b. a second elongated fixed tab means upwardly projecting from a second support means fixedly and immovably spaced apart from said first support means at substantially the same height as first tab means; said first and second support means, together with said tab means, being adapted to maintain said bag, suspended therefrom by said handles, in an open position;

c. each of said tab means having a rearwardly directed protrusion at one end portion thereof adapted to retain said bag handles on said tab means when said bag is suspended in said apparatus; and d. rearwardly located means for holding a stack of said plastic bags between said first and second support means.

24. The combination of a bag pack with apparatus that facilitates the loading of articles in an open mouth plastic bag, said bag pack comprising:

a plurality of open mouth plastic bags having integral handle loops disposed on opposite sides of the mouth thereof, said bags being assembled into said pack by heat welding through an area adjacent to the bag mouth and within the confines of a perforated tab section on the upper portion of the front and rear walls of the bag, said apparatus comprising:

a. a first elongated tab means upwardly projecting from a first support means;

b. a second elongated tab means upwardly projecting from a second support means spaced apart from said first support means at substantially the same height as said first support means; said first and second support means, together with said tab means, being adapted to maintain said bag, suspended therein by said handles, in an open position;

c. each of said tab means having a rearwardly directed protrusion at one end portion thereof adapted to retain said bag handles on said tab means when said bag is suspended in said apparatus;

d. a rearwardly located support for holding said stack of plastic bags at said perforated tab section to suspend said bag pack from said support; and e. said apparatus being adapted to be positioned above a substantially horizontal support surface to support the bottom of said bag during loading;

whereby a user removes the topmost bag from said stack of bags, places each of said handle loops of said bag on a respective one of said first and second tabs, loads said bag, and removes said loaded bag from said apparatus by lifting said handle loops from said first and second tabs.

25. An apparatus that facilitates the loading of articles in an open-mouth plastic bag having integral handle loops disposed on opposite sides of the mouth thereof, whereby said bag is suspended within said apparatus and held in an open position by means of said handles, said apparatus comprising:

a substantially horizontal support surface to support the bottom of said bag during loading;

first and second oppositely disposed, upstanding side support means, said second support means being spaced apart from said first support means at substantially the same height as said first support means;

first and second upwardly projecting elongated tab means projecting respectively from said first and second support means, said tab means being of reduced width with respect to the width of said support means;

said first and second tab means being spaced apart at a distance substantially the same as the distance between said handles when said bag is in an open condition;

said first and second support means, together with said tab means being adapted to maintain said bag, suspended therefrom by said handles in an open position;

a rearwardly directed protrusion at one end portion of each of said tabs, each of which protrusions is adapted to retain on its tab a handle of said bag when said bag is suspended in said apparatus; and a bag support attached to an upper rear portion of said support means spanning a U-shaped opening in which said bag is suspended therefrom by said handles, said support holding a stack of said plastic bags.

26. A method of loading articles in an open mouth plastic bag having integral handle loops disposed on opposite sides of the mouth in an apparatus comprising a first elongated tab means upwardly projecting from a first support means, a second elongated tab means upwardly projecting from a second support means fixedly and immovably spaced apart from said first support means at substantially the same height as said first support means, said first and second support means together with said tab means being adapted to maintain said bag suspended therefrom by said handles in an open position, said tab means comprising rearwardly directed protrusions adapted to retain said bag handles on said tab means when said bag is suspended in said apparatus, and rearwardly located means for holding a stack of said plastic bags, said apparatus being adapted to be positioned above a substantially horizontal support surface to support the bottom of said bag during loading; comprising the steps of:

a. locating a stack of plastic bags on said holding means.

b. removing the topmost bag from said stack by grasping its handles, holding one handle in each hand, c. opening the handle area, d. placing each handle over a respective one of said tab means, e. loading said bag, and f. lifting said handles from said tab means to remove said bag from said apparatus.

27. A method of loading articles in an open mouth plastic bag having integral handle loops disposed on opposite sides of the mouth thereof, a plurality of said bags being assembled into a bag pack by heat welding through an area adjacent to the bag mouth and within the confines of a perforated tab section on the upper portion of the front end rear walls of the bag, said method being performed on apparatus comprising:

a. a first elongated tab means upwardly projecting from a first support means;

b. a second elongated tab means upwardly projecting from a second support means spaced apart from said first support means at substantially the same height as said first support means, said first and second support means, together with said tab means, being adapted to maintain said bag, suspended therein by said handles, in an open position;

c. each of said tab means having a rearwardly directed protrusion at one end portion thereof adapted to retain said bag handles on said tab means when said bag is suspended in said apparatus;

d. a rearwardly located support for holding said stack of plastic bags at said perforated tab section to suspend said bag pack from said support; and e. said apparatus being adapted to be positioned above a substantially horizontal support surface to support the bottom of said bag during loading, said method comprising the steps of:

suspending said bag pack on said support by means extending through said perforated tab section of the bags in said pack;

removing the topmost bag from said stack by grasping its handles, holding one handle in each hand;

opening the handle area;

placing each handle over a respective one of said tab means;

loading said bag; and lifting said handles from said tab means to remove said bag from said apparatus.

28. A method as in claim 27, wherein said bag is separated from said pack at said perforated tab section as it is removed from said stack and the handles thereof placed on respective tab means.

29. An apparatus for holding open the mouth of the plastic bag having a pair of handle loops respectively disposed on opposite sides of the mouth, said apparatus comprising:

a pair of upwardly projecting tabs, over which said handle loops are respectively mountable, each tab having substantially all portions thereof residing in a respective plane; and means for supporting said pair of tabs at substantially the same level, said tabs projecting upwardly from said supporting means, said supporting means supporting said tabs such that the respective tabs and planes in which they reside are substantially parallel to one another, and said tabs are fixed in position, when said handle loops are mountable thereon, and spaced a fixed distance apart, said supporting means including support portions respectively connected with and supporting said tabs in a manner which defines an opening in a direction in front of and between said tabs and respective support portions to permit the passage of a bag therebetween during the mounting and demounting of respective handle loops of a bag on and off said tabs, said support portions residing in substantially the same plane as the tabs to which they are connected and defining surfaces at said supporting means on opposite ends of the tabs for supporting bag handles placed over the tabs.

30. The apparatus of claim 29, wherein each of said support portions comprises a side member upstanding from a horizontal bag bottom support surface, and wherein said upwardly projecting tabs each project from the top edge of one of said side members and is of reduced width relative to the width of said side members.

31. The apparatus of claim 30, further comprising a plastic bag, having integral handle loops on opposite sides of the mouth opening thereof, suspended therein by means of said handle loops being mounted over said upwardly projecting tabs.

32. The apparatus of claim 29, wherein each of said tabs has at one end portion thereof a protrusion to help retain a handle loop on a tab.

33. The apparatus of claim 32, wherein said protrusion is on a rearward end portion of a tab away from said opening.

34. The apparatus of claim 32, wherein said rearward protrusions are constructed from a separate strip of material, which material is bent into a curved configuration to form said protrusions and the remaining length of which material is made to conform to the contour of an upper edge of a said tab.

35. The apparatus of claim 32, wherein said rearward protrusions are an integral part of said tabs.

36. The apparatus of claim 32, wherein said rearward protrusions are constructed separately from said tabs and are adjustably mounted thereon.

37. The apparatus of claim 32, wherein said rearward protrusions are constructed separately from said tabs and are rigidly mounted thereon.

38. The apparatus of claim 29, further comprising a horizontally disposed member, adapted to hold a stack of said plastic bags, each end of said horizontally disposed member being attached to one of said support portions, such that said horizontally disposed member spans the open area between said support portions but does not interfere with a bag suspended within said apparatus.

39. The apparatus of claim 38, constructed as a free-standing unit.

40. The apparatus of claim 38, further comprising a stack of plastic bags supported to and held by said horizontally disposed member.

41. The apparatus of claim 38, installed in a check-out counter of a business establishment.

42. The apparatus of claim 41, constructed as a built-in, integral component of the check-out counter.

43. An apparatus that facilitates the loading of articles in an open mouth plastic bag having integral handle loops disposed on opposite sides of the mouth thereof, whereby said bag is suspended within said apparatus and held in open position by means of said handles, said apparatus comprising:

a. a first elongated fixed tab upwardly projecting from a first support means;

b. a second elongated fixed tab upwardly projecting from a second support means, said second tab being disposed substantially parallel to said first tab and spaced apart therefrom at a distance substantially the same as the distance between said handles when said bag is in open condition;

c. both of said tabs being of substantially similar configuration and each being adapted to fit within the open area of one of said handles;

d. a rearwardly directed protrusion at one end portion of each of said tabs, each of said protrusions being adapted to retain a handle of said bag when said bag is suspended in said apparatus; each of said rearwardly directed protrusions being formed of an elongated material bent into a curved configuration.

44. The apparatus of claim 43, wherein said rearwardly directed protrusions are constructed separately from said tabs and are mounted thereon.

45. The apparatus of claim 43, wherein said bent elongated material extends to form a top of each of said tabs

*46. The apparatus of claim 45, wherein said bent elongated material is a round metallic material.*

*47. The apparatus of claim 46, wherein said bent elongated material is one of a wire and metal rod.*

*48. The apparatus of claim 43, wherein said bent elongated material is a round metallic material.*

*49. The apparatus of claim 48, wherein said bent elongated material is one of a wire and metal rod.*

• • • • •